H. A. WILSON.
WEEDER ATTACHMENT FOR CORN CULTIVATORS.
APPLICATION FILED SEPT. 24, 1914.
1,127,560.
Patented Feb. 9, 1915.
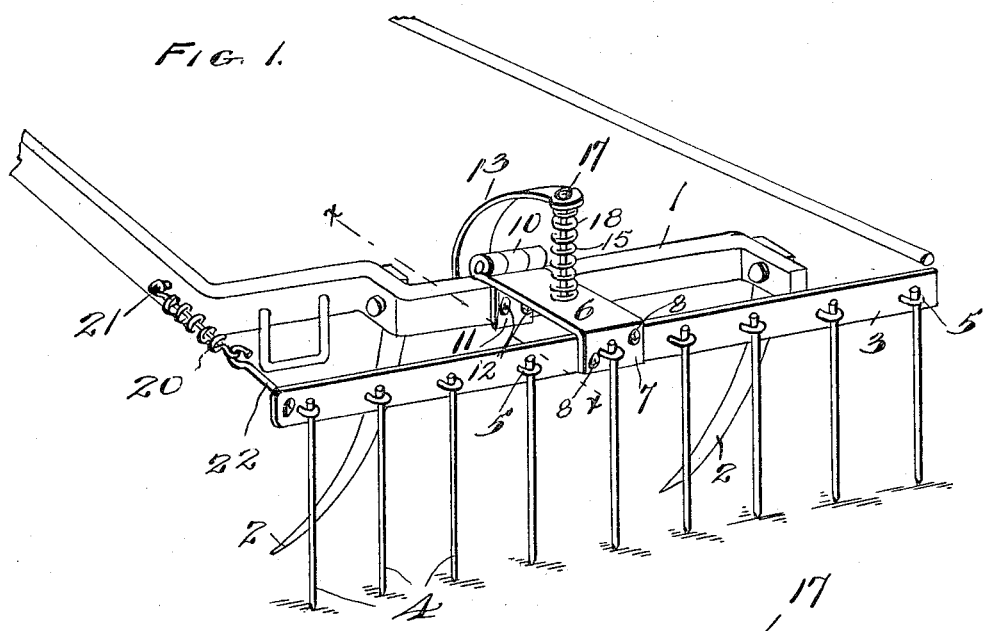
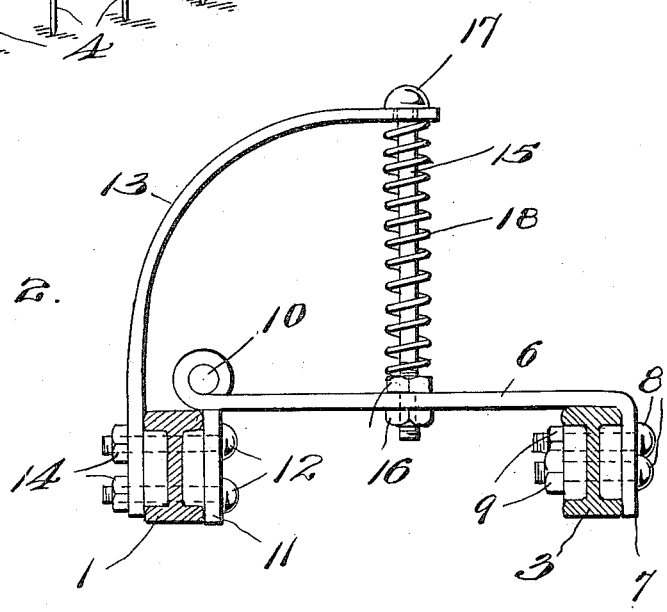
Witnesses.
C. K. Davis
M. L. Newcomb
Inventor
HENRY A. WILSON
By Herman A. Phillips
Attorney

UNITED STATES PATENT OFFICE.

HENRY A. WILSON, OF SPENCER, SOUTH DAKOTA.

WEEDER ATTACHMENT FOR CORN-CULTIVATORS.

1,127,560.   Specification of Letters Patent.   Patented Feb. 9, 1915.

Application filed September 24, 1914.  Serial No. 863,301.

*To all whom it may concern:*

Be it known that I, HENRY A. WILSON, a citizen of the United States of America, residing at Spencer, in the county of McCook and State of South Dakota, have invented certain new and useful Improvements in Weeder Attachments for Corn-Cultivators, of which the following is a specification.

The present invention relates to an improved weeder attachment for corn cultivators.

The primary object of the invention is the provision of a device which may be used in connection with a corn cultivator, and which may be attached and detached with facility. The device is arranged in connection with the frame of the cultivator so that the teeth of the attachment are compelled to follow the uneven or irregular places of the soil at all times, and provision also is made so that the attachment will pass readily over stones or other obstructions.

With my device attached to a corn cultivator, I am enabled to harrow the loose soil following the shovels, comb and separate all accumulated bunches of grass and weed roots, thereby exposing them to the sun's rays in order to destroy their vitality; and accomplish the breaking of the soft lumps of soil before sun baking. The soil following the shovels of the cultivator is also leveled, and this action creates an even mulch of loose soil on the surface which acts as a blanket to hold the moisture.

The invention consists in certain combinations and arrangements of parts whereby the device is attached to the cultivator frame, and in the spring or cushion connection of the device with the frame as will be more specifically hereinafter pointed out and claimed.

In the accompanying drawings I have illustrated one complete example of the physical embodiment of my invention constructed according to the best mode I have so far devised for the practical application of the principles of the invention.

Figure 1 is a perspective view showing so much of a cultivator frame as is necessary to illustrate the application of my invention. Fig. 2 is an enlarged detail sectional view at line $x$—$x$, in Fig. 1.

In the preferred embodiment of my invention as illustrated in the drawings, I have shown a conventional or usual type of corn cultivator of which the frame 1 is provided with the harrow teeth 2—2, and the cultivator or implement is, of course, equipped with the other necessary elements which are not essential to the exemplification of my present invention.

The implement which embodies my invention, comprises a metallic bar or beam 3, having depending therefrom a suitable number of iron teeth 4, which are pointed at their lower ends, and are secured by eyebolts 5 at their upper ends to the beam 3. The beam is resiliently supported from the frame 1 of the cultivator, in order that the weeder teeth 4 may rise and pass over the obstruction, such as a stone, when the cultivator is being drawn over the ground. For this purpose I employ a hinge to connect the beam 3 with the cultivator frame, and this hinge includes a special strap 6, which is elongated and provided with a bent end 7. This overhanging or bent end 7 of the hinge strap 6 is bolted to the beam 3, as shown by bolts 8, and the clamping nuts 9 are used to secure a rigid joint. The hinge is jointed at 10, and the shorter strap 11, which is parallel with the bent end 7 of the long strap, is attached by bolts 12 to the frame 1 of the cultivator. In this manner the weeder attachment is hinged to the cultivator frame.

To resiliently support the weeder attachment, I employ the metallic plate 13 which is secured to the cultivator beam 1, by the same bolts 12 which secure the short strap of the hinge to the frame, the nuts 14 being used to secure the joint. As best seen in Fig. 2, this plate 13 curves upward and over toward the weeder attachment, and preferably this metallic plate is resilient or elastic. At its upper end the plate is perforated for a bolt 15 which also passes through a perforation in the strap 6, and is clamped to the strap by means of the upper and lower nuts 16. The bolt head 17 holds down the end of the plate 13, and a coil spring 18 is located between the underside of the plate and the upper nut 16. Thus, should the weeder attachment strike an obstruction, the attachment will swing on its hinge joint 10, and the shock of the movement will be taken up by the spring 18 between the nut 16 and the plate 13, the bolt 15 passing freely through the perforated end of the plate 13. In this manner the weeder attachment is normally held down so that the points of the iron teeth 4 will pass lightly over the surface of the ground, but when an obstruction such as a stone is encountered, the attachment may rise, pass thereover, and then quickly return to operative position.

If required, a spring 20 may be employed, and this is connected by an eyebolt 21 to the cultivator frame 1, and by another bolt 22 to the beam 3 of the attachment. This spring may act as an auxiliary attachment to regulate the movement of the weeder.

From the above description taken in connection with my drawings it is obvious that I have provided a device which is facile in operation, efficient, and economical, and one which will perform its functions in a comparatively perfect manner.

What I claim is:

1. The combination with a cultivator frame of a weeder attachment, a hinge having one strap attached to the cultivator frame and a longer strap fixed to the weeder attachment, and a support on the frame having resilient connection with the long strap.

2. The combination with a cultivator frame of a weeder, a hinge joint between the frame and weeder, the short strap of the hinge attached to the frame and a long strap of said hinge having a bent end attached to the weeder, a curved supporting plate attached to the frame and projecting over the long strap, a bolt connecting the end of said plate with said strap, and a spring between the plate and strap.

In testimony whereof I affix my signature in presence of two witnesses.

HENRY A. WILSON.

Witnesses:
E. R. CAMPBELL,
E. J. MORGAN.

Copies of this patent may be obtained for five cents each, by addressing the "Commissioner of Patents, Washington, D. C."